US009127813B2

(12) United States Patent
Campbell et al.

(10) Patent No.: US 9,127,813 B2
(45) Date of Patent: Sep. 8, 2015

(54) RESPONDING TO MOISTURE AT ONE OR MORE ZONES AROUND AN OUTER SURFACE OF A LIQUID-CARRYING PIPE

(75) Inventors: Keith M. Campbell, Cary, NC (US); Vinod Kamath, Raleigh, NC (US); Christopher L. Wood, Greenville, NC (US)

(73) Assignee: Lenovo Enterprise (Singapore) Pte. Ltd., Singapore (SG)

( * ) Notice: Subject to any disclaimer, the term of this patent is extended or adjusted under 35 U.S.C. 154(b) by 652 days.

(21) Appl. No.: 13/403,094

(22) Filed: Feb. 23, 2012

(65) Prior Publication Data
US 2013/0220423 A1 Aug. 29, 2013

(51) Int. Cl.
*F17D 3/00* (2006.01)
(52) U.S. Cl.
CPC ............. *F17D 3/00* (2013.01); *Y10T 137/0318* (2015.04)
(58) Field of Classification Search
CPC .. F25B 49/005; F25B 49/027; F25B 2500/19; F25B 2500/222; F25B 2600/07; F25B 2600/21; F25B 2600/111; F25B 2700/21175; F24F 3/1405; F24F 2011/0054; F24F 2011/0068; F24F 2011/0091; F28D 7/12
USPC ................... 702/55, 50–51, 85, 99–100, 127, 702/130–132, 189; 62/259.1–259.2, 272, 62/285, 304, 309–310, 337–441; 312/236–237; 700/275–278, 281; 73/40, 49.1, 49.5, 290 R, 291
See application file for complete search history.

(56) References Cited

U.S. PATENT DOCUMENTS

| | | | |
|---|---|---|---|
| 4,965,554 A | 10/1990 | Darling | |
| 5,174,150 A | 12/1992 | Mann | |
| 5,190,069 A * | 3/1993 | Richards | ....................... 137/312 |
| 5,668,478 A | 9/1997 | Buschur | |
| 6,175,310 B1 | 1/2001 | Gott | |
| 6,865,941 B2 | 3/2005 | Gibbs | |
| 7,142,425 B2 | 11/2006 | Tomioka et al. | |
| 7,218,237 B2 | 5/2007 | Kates | |
| 7,218,247 B2 | 5/2007 | Lee | |

(Continued)

OTHER PUBLICATIONS

Kang et al., Closed Loop Liquid Cooling for High Performance Computer Systems, Jul. 8-12, 2007, Proceedings of IPACK2007, ASME InterPACK '07, Vancouver, British Columbia, Canada, 7 pp.*

(Continued)

*Primary Examiner* — Toan Le
(74) *Attorney, Agent, or Firm* — Edward J. Lenart; Katherine S. Brown; Kennedy Lenart Spraggins LLP (57) ABSTRACT

Methods, apparatuses, and computer program products for responding to moisture at one or more zones around an outer surface of a liquid-carrying pipe are provided. Embodiments include monitoring, by a moisture correction controller, a plurality of moisture sensors, each moisture sensor configured to detect moisture at a separate zone around the outer surface of the liquid-carrying pipe; based on the monitoring of the plurality of moisture sensors, calculating and tracking, for each zone, a level of moisture detected by a moisture sensor; based on the tracked levels of moisture detected at the zones, selecting, between condensation or a leak from within the liquid-carrying pipe as a source of the moisture detected at the zones around the liquid-carrying pipe; and administering a corrective action based on the selection of the source of the moisture detected at the zones around the liquid-carrying pipe.

16 Claims, 5 Drawing Sheets

(56) References Cited

U.S. PATENT DOCUMENTS

| | | |
|---|---|---|
| 2005/0217299 A1* | 10/2005 | Chu et al. .................... 62/259.2 |
| 2006/0171117 A1 | 8/2006 | Hamman |
| 2007/0051166 A1 | 3/2007 | Baker et al. |
| 2008/0245083 A1 | 10/2008 | Tutunoglu et al. |
| 2009/0301123 A1 | 12/2009 | Monk et al. |
| 2010/0290190 A1 | 11/2010 | Chester et al. |

OTHER PUBLICATIONS

Disclosed Anonymously; System and Method to Detect and Limit Water Cooling Leak Damage in a Server System; IP.com Prior Art Database; IP.com No. IPCOM000211824D; Oct. 19, 2011.

\* cited by examiner

RESPONDING TO MOISTURE AT ONE OR MORE ZONES AROUND AN OUTER SURFACE OF A LIQUID-CARRYING PIPE

BACKGROUND OF THE INVENTION

1. Field of the Invention

The field of the invention is data processing, or, more specifically, methods, apparatuses, and computer program products for responding to moisture at one or more zones around an outer surface of a liquid-carrying pipe.

2. Description Of Related Art

With the rising power consumption in electrical devices like computer servers, providing sufficient air to cool the servers becomes an increasingly more difficult task. One alternative is to use fluid based temperature altering systems such as, for example, cooled liquid-carrying pipes. However, when using water or other liquids to cool electrical components (e.g., a microprocessor), moisture resulting from the fluid cooling system can be potentially damaging to the electrical devices. Thus, responding to moisture around a liquid-carrying pipe may play an important role in the efficient operation of a system utilizing a fluid based temperature altering system.

SUMMARY OF THE INVENTION

Methods, apparatuses, and computer program products for responding to moisture at one or more zones around an outer surface of a liquid-carrying pipe are provided. Embodiments include monitoring, by a moisture correction controller, a plurality of moisture sensors, each moisture sensor configured to detect moisture at a separate zone around the outer surface of the liquid-carrying pipe; based on the monitoring of the plurality of moisture sensors, calculating and tracking, for each zone, by the moisture correction controller, a level of moisture detected by a moisture sensor; based on the tracked levels of moisture detected at the zones, selecting, by the moisture correction controller, between condensation or a leak from within the liquid-carrying pipe as a source of the moisture detected at the zones around the liquid-carrying pipe; and administering, by the moisture correction controller, a corrective action based on the selection of the source of the moisture detected at the zones around the liquid-carrying pipe.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
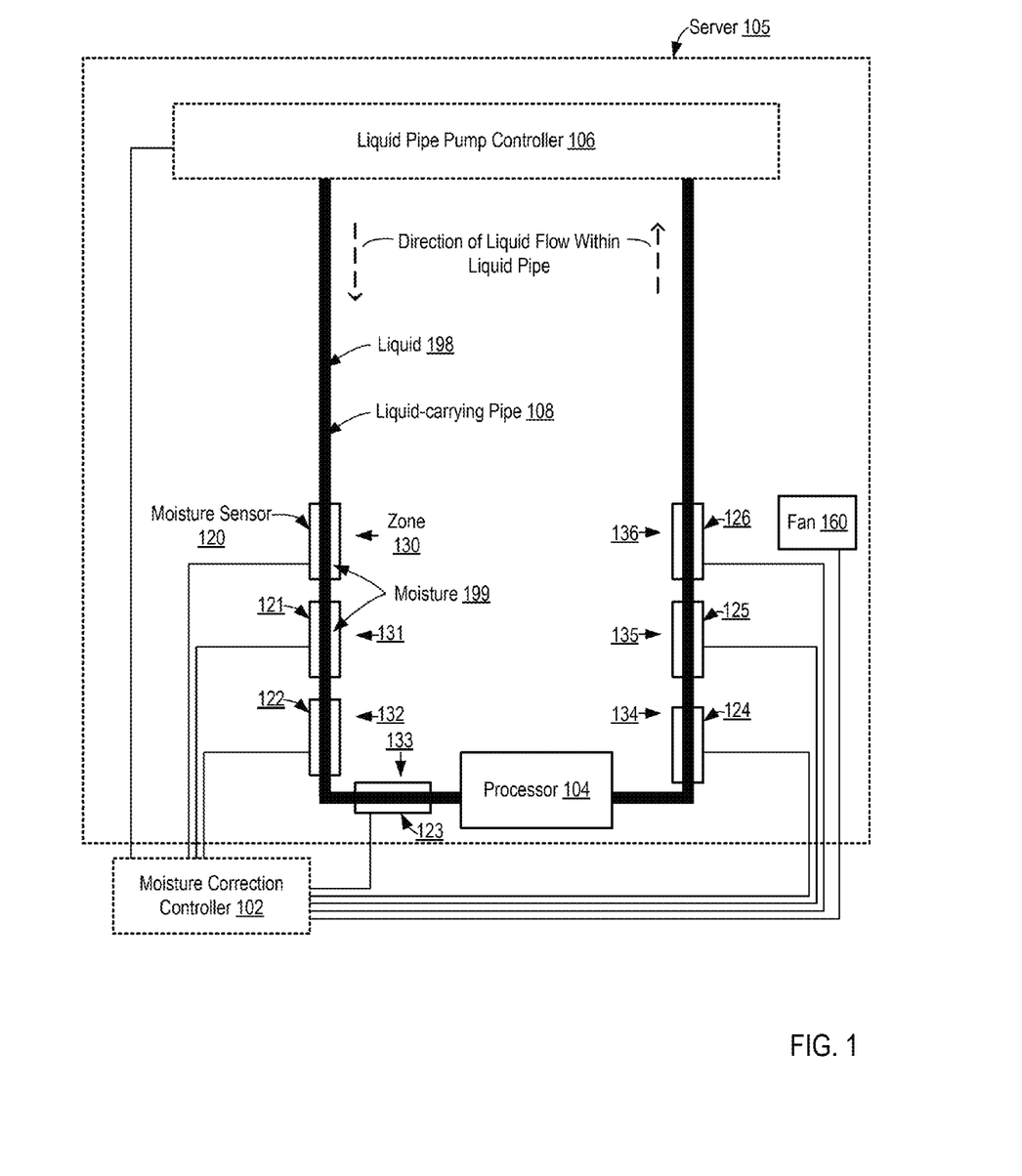
FIG. 1 sets forth a diagram of a system for responding to moisture at one or more zones around an outer surface of a liquid-carrying pipe according to embodiments of the present invention.

Exemplary methods, apparatuses, and computer program products for responding to moisture at one or more zones around an outer surface of a liquid-carrying pipe in accordance with the present invention are described with reference to the accompanying drawings, beginning with FIG. 1. FIG. 1 sets forth a diagram of a system for responding to moisture at one or more zones around an outer surface of a liquid-carrying pipe according to embodiments of the present invention. The system of FIG. 1 includes a server (105) with a processor (104) that is cooled by liquid (198) flowing through a liquid-carrying pipe (108) controlled by a liquid-carrying pipe pump controller (106). A liquid-carrying pipe pump controller is a device that controls the pressure, temperature, and direction of liquid flow within a liquid-carrying pipe.

As the liquid-carrying pipe pump controller (106) pumps the liquid (198) through the liquid-carrying pipe (108), moisture (199) may gather on the outside of the liquid-carrying pipe (108). The moisture (199) may be the result of a leak from within the liquid-carrying pipe (108) or the result of liquid within the air surrounding the outside of the liquid-carrying pipe (108) condensing on the cooled outer surface of the liquid-carrying pipe (108). Either source of the moisture presents a possible danger to the electrical devices of the server (105). However, the cause or source of the moisture may determine which actions would most effectively correct the situation. For example, if the moisture (199) is the result of condensation, then preventing the accumulation of additional moisture may be achieved by increasing the temperature of the liquid (198). However, if the moisture (199) is the result of a leak from within the liquid-carrying pipe (108) then changing the temperature of the liquid (198) would be an inefficient solution to the problem. As this example illustrates, identifying the source or origin of moisture may be instrumental in efficiently responding to the situation.

To respond to moisture around the liquid-carrying pipe, the server (105) of FIG. 1 utilizes a moisture correction controller (102). The moisture correction controller (102) of FIG. 1 is configured to monitor a plurality of moisture sensors (120-126). Each moisture sensor of FIG. 1 is configured to detect moisture at a separate zone (130-136) around the liquid-carrying pipe (108). A moisture sensor may be any sensor capable of detecting moisture at an area around a liquid-carrying pipe. For example, a moisture sensor may detect moisture using conductive layers separated by a dielectric layer. In this example of a moisture sensor, the conductive layers and the dielectric layer are fluid permeable so that the fluid that contacts one of the conductive layers will be absorbed to come into contact with the dielectric layer thus changing the capacitance between the layers. Continuing with this example, the moisture sensor may utilize circuitry to measure the capacitance between the conductive layers where the presence of the fluid will change the capacitance level. A moisture sensor can include logic that compares the measured capacitance value to a predetermined capacitance value or range of values that were previously measured and known for a dry condition of the conductor and dielectric layers. Thus in this example of a moisture sensor, contact with fluid moisture may result in a measurable change in capacitance that the moisture sensor can use to detect moisture around the outer surface of the liquid-carrying pipe. In response to detecting moisture, the moisture sensor (120) of FIG. 1 may be configured to transmit via a wire or wireless connection an indication of the moisture level of a zone of the liquid-carrying pipe to other control systems or an administrator.

The moisture correction controller (102) is also configured to calculate and track, for each zone, based on the monitoring of the plurality of moisture sensors, a level of moisture detected by a moisture sensor. For example, the moisture correction controller may determine which zones of the liquid-carrying pipe have moisture and if the moisture levels of zones are changing. The moisture correction controller (102) utilizes the tracked levels of moisture detected at the zones around the liquid-carrying pipe to select between condensation or a leak from within the liquid-carrying pipe as a source of the moisture detected at the zones around the liquid-carrying pipe. For example, if all of the zones have a gradual and even accumulation of moisture then the detected moisture may correspond to condensation along the liquid-carrying pipe. As another example, if adjacent zones have different moisture levels then the moisture may correspond to a leak. The moisture correction controller is also configured to administer a corrective action based on the selection of the source of the moisture detected at the zones around the liquid-carrying pipe. A correction action may include altering the temperature of the liquid (198), increasing a speed of a fan (160) directed to the liquid-carrying pipe (108), changing the flow rate of the liquid (198) within the liquid-carrying pipe (108), shutting down one or more values (not pictured) of the liquid-carrying pipe, or instructing the server (105) to reduce power consumption.

It will be appreciated that the example systems and methods herein are also applicable to and can be used in a variety of environments rather than a liquid cooled system. For example, the systems and methods described herein can be implemented in any device that involves a fluid cooled system for electrical components like an automobile, an aircraft, a ship, a spacecraft, a submarine, as well as a building with a computer room. It will also be appreciated that the example systems and methods are not limited to cooling systems but also heating systems that may be used to maintain the temperature of electrical components in low heat conditions such as high altitude aircraft, spacecraft, arctic environments, and the like. The example systems and methods may also be implemented with fluid carrying systems that carry fluid without involving a heat transfer.

Responding to moisture at one or more zones around an outer surface of a liquid-carrying pipe in accordance with the present invention is generally implemented with computers, that is, with automated computing machinery. In the system of FIG. 1, for example, the moisture correction controller (102) is implemented to some extent at least as computers. For further explanation, therefore, FIG. 2 sets forth a block diagram of automated computing machinery comprising an example moisture correction controller (202) useful in responding to moisture at one or more zones around an outer surface of a liquid-carrying pipe according to embodiments of the present invention. The example moisture correction controller (202) of FIG. 2 includes at least one computer processor (256) or 'CPU' as well as random access memory (268) ('RAM') which is connected through a high speed memory bus (266) and bus adapter (258) to processor (256) and to other components of the moisture correction controller (202).

Figure 2:
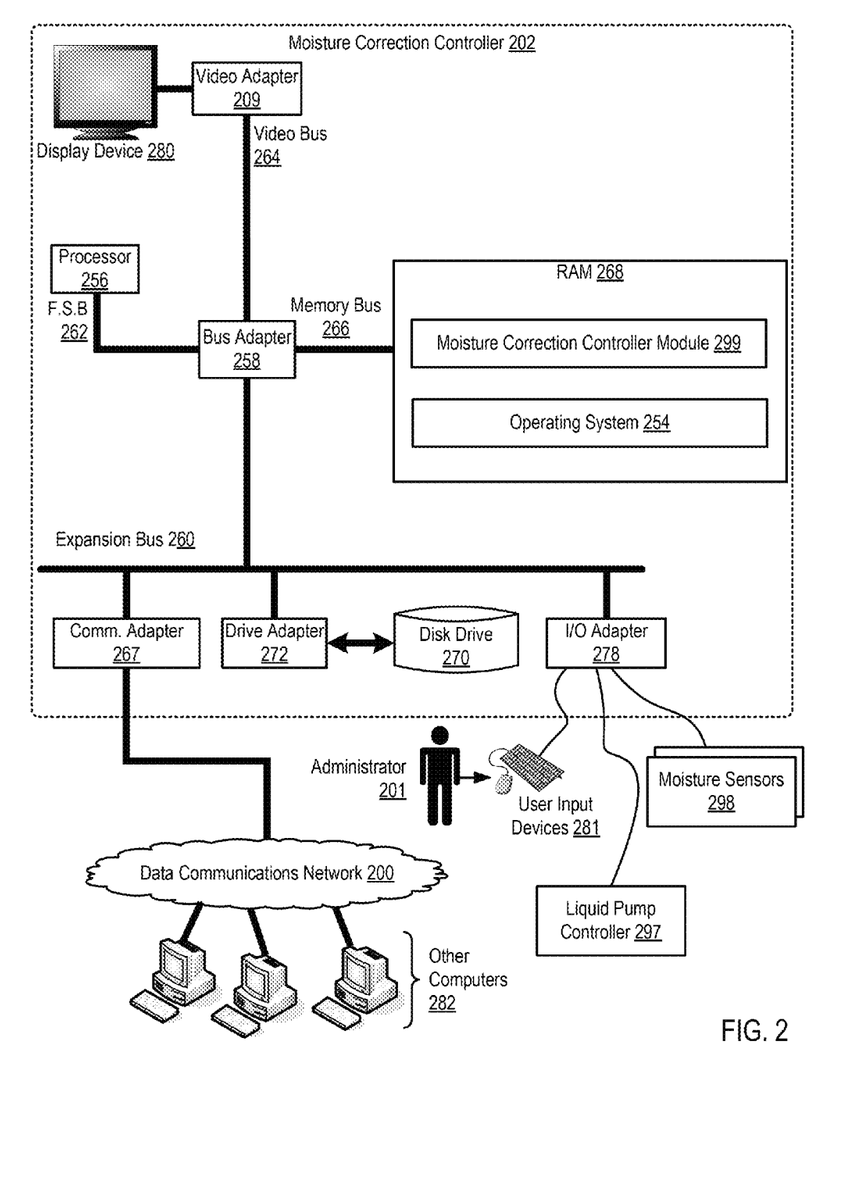
FIG. 2 sets forth a block diagram of automated computing machinery comprising an example moisture correction controller useful in responding to moisture at one or more zones around an outer surface of a liquid-carrying pipe according to embodiments of the present invention.

Stored in RAM (268) is a moisture correction controller module (299) that includes computer program instructions for responding to moisture at one or more zones of a liquid-carrying pipe according to embodiments of the present invention. The moisture correction controller module (299) includes computer program instructions that when executed by the processor (256) cause the moisture correction controller (202) to carry out the steps of: monitoring a plurality of moisture sensors (298); based on the monitoring of the plurality of moisture sensors (298), calculating and tracking, for each zone, a level of moisture detected by a moisture sensor; based on the tracked levels of moisture detected at the zones, selecting between condensation or a leak from within the liquid-carrying pipe as a source of the moisture detected at the zones around the liquid-carrying pipe; and administering a corrective action based on the selection of the source of the moisture detected at the zones around the liquid-carrying pipe.

Also stored in RAM (268) is an operating system (254). Operating systems useful responding to moisture at one or more zones around an outer surface of a liquid-carrying pipe according to embodiments of the present invention include UNIX™, Linux™, Microsoft XP™, AIX™, IBM's i5/OS™, and others as will occur to those of skill in the art. The operating system (254) and the moisture correction controller module (299) in the example of FIG. 2 are shown in RAM (268), but many components of such software typically are stored in non-volatile memory also, such as, for example, on a disk drive (270).

The moisture correction controller (202) of FIG. 2 includes disk drive adapter (272) coupled through expansion bus (260) and bus adapter (258) to processor (256) and other components of the moisture correction controller (202). Disk drive adapter (272) connects non-volatile data storage to the moisture correction controller (202) in the form of disk drive (270). Disk drive adapters useful in computers for responding to moisture at one or more zones around an outer surface of a liquid-carrying pipe according to embodiments of the present invention include Integrated Drive Electronics ('IDE') adapters, Small Computer System Interface (SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example moisture correction controller (202) of FIG. 2 includes one or more input/output ('I/O') adapters (278). I/O adapters implement user-oriented input/output through, for example, software drivers and computer hardware for controlling output to display devices such as computer display screens, as well as user input from user input devices (281) such as keyboards and mice. In the example of FIG. 2, the I/O adapter (278) is coupled to a plurality (298) of moisture sensors and a liquid pump controller (297). Although an I/O adapter is illustrated, the moisture correction controller (202) may be coupled wirelessly or wired to moisture sensors, liquid pump controller, and other control components and systems through other adapters, such as communication adapter (267). That is, the moisture correction controller (202) may receive moisture information from remotely connected moisture sensors or from a smart device that aggregates readings from remotely connection sensors. Similarly, the moisture correction controller (202) may remotely administer a correction action via any number of adapters.

The example moisture correction controller (202) of FIG. 2 includes a video adapter (209), which is an example of an I/O adapter specially designed for graphic output to a display device (280) such as a display screen or computer monitor. Video adapter (209) is connected to processor (256) through a high speed video bus (264), bus adapter (258), and the front side bus (262), which is also a high speed bus.

The exemplary moisture correction controller (202) of FIG. 2 includes a communications adapter (267) for data communications with other computers (282) and for data communications with a data communications network (200). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for responding to moisture at one or more zones around an outer surface of a liquid-carrying pipe according to embodiments of the present invention include modems for wired dial-up communications, Ethernet (IEEE 802.3) adapters for wired data communications network communications, and 802.11 adapters for wireless data communications network communications.

Figure 3:
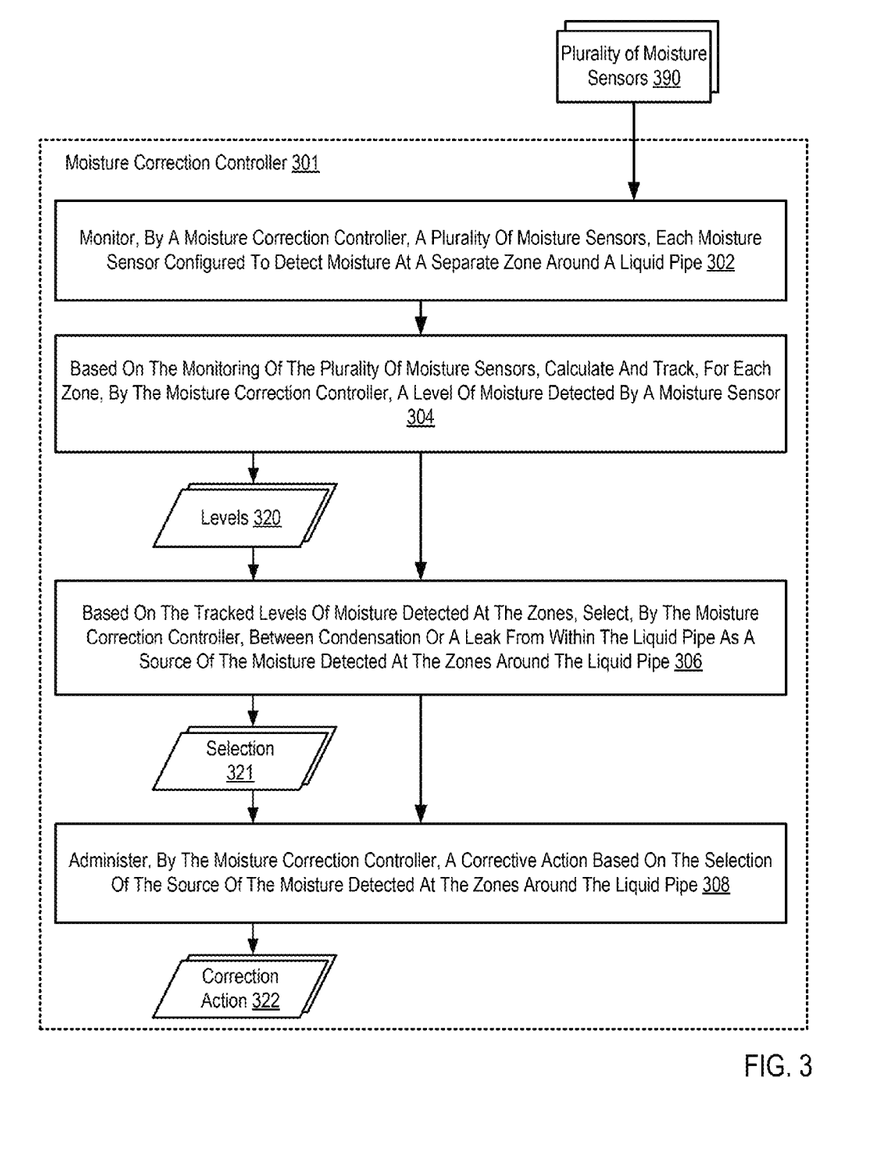
FIG. 3 sets forth a flow chart illustrating an exemplary method for responding to moisture at one or more zones around an outer surface of a liquid-carrying pipe according to embodiments of the present invention.

For further explanation, FIG. 3 sets forth a flow chart illustrating an exemplary method for responding to moisture at one or more zones around an outer surface of a liquid-carrying pipe according to embodiments of the present invention. The method of FIG. 3 includes monitoring (302), by a moisture correction controller (301), a plurality (390) of moisture sensors. In the example of FIG. 3, each moisture sensor is configured to detect moisture at a separate zone around the outer surface of the liquid-carrying pipe. Monitoring (302) a plurality (390) of moisture sensors may be carried out by receiving via a wire or wireless connection, moisture level information from each of the moisture sensors.

The method of FIG. 3 includes calculating and tracking (304), for each zone, by the moisture correction controller (301), based on the monitoring of the plurality (390) of moisture sensors, a level of moisture detected by a moisture sensor. Calculating and tracking (304), for each zone, based on the monitoring of the plurality (390) of moisture sensors, a level of moisture detected by a moisture sensor may be carried out by storing an indication of a moisture level for each zone; and determining trends or patterns associated with the moisture levels.

The method of FIG. 3 also includes selecting (306), by the moisture correction controller (301), based on the tracked levels (320) of moisture detected at the zones, between condensation or a leak from within the liquid-carrying pipe as a source of the moisture detected at the zones around the liquid-carrying pipe. Selecting (306) based on the tracked levels (320) of moisture detected at the zones, between condensation or a leak from within the liquid-carrying pipe as a source of the moisture detected at the zones around the liquid-carrying pipe may be carried out by storing a selection (321) at the moisture correction controller (301).

The method of FIG. 3 includes administering (308), by the moisture correction controller (301), a corrective action (322) based on the selection (321) of the source of the moisture detected at the zones around the liquid-carrying pipe. A correction action may include altering the temperature of the liquid (198), increasing a speed of a fan (160) directed to the liquid-carrying pipe (108), changing the flow rate of the liquid (198) within the liquid-carrying pipe (108), shutting down one or more valves (not pictured) of the liquid-carrying pipe, or instructing the server (105) to reduce power consumption. Administering (308) a corrective action (322) based on the selection (321) of the source of the moisture detected at the zones around the liquid-carrying pipe may be carried out by identifying a corrective action that corresponds to the selection; performing the corrective action; instructing one or more other components of a system to perform the corrective action.

Figure 4:
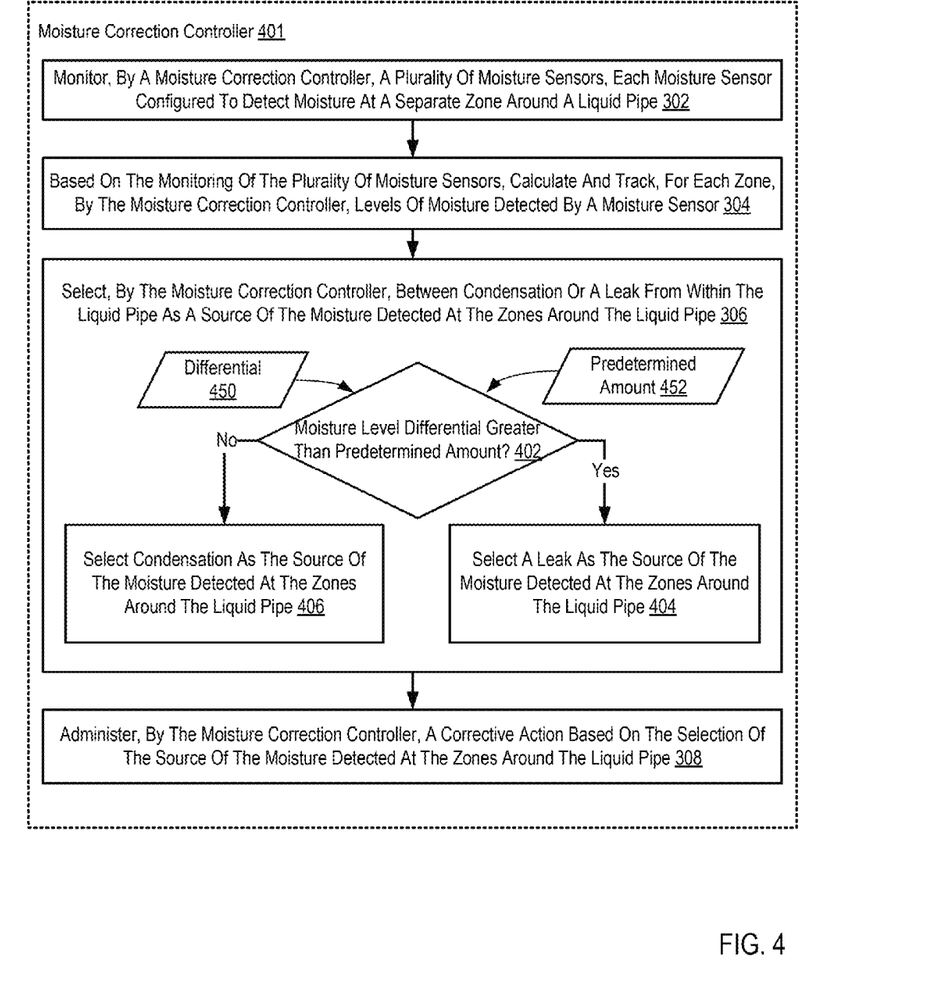
FIG. 4 sets forth a flow chart illustrating a further exemplary method for responding to moisture at one or more zones around an outer surface of a liquid-carrying pipe according to embodiments of the present invention.

For further explanation, FIG. 4 sets forth a flow chart illustrating a further exemplary method for responding to moisture at one or more zones around an outer surface of a liquid-carrying pipe according to embodiments of the present invention. The method of FIG. 4 is similar to the method of FIG. 3 in that the method of FIG. 4 also includes: monitoring (302), by a moisture correction controller (301), a plurality (390) of moisture sensors; based on the monitoring of the plurality (390) of moisture sensors, calculating and tracking (304), for each zone, by the moisture correction controller (301), a level of moisture detected by a moisture sensor; based on the tracked levels (320) of moisture detected at the zones, selecting (306), by the moisture correction controller (301), between condensation or a leak from within the liquid-carrying pipe as a source of the moisture detected at the zones around the liquid-carrying pipe; and administering (308), by the moisture correction controller (301), a corrective action (322) based on the selection (321) of the source of the moisture detected at the zones around the liquid-carrying pipe.

In the method of FIG. 4, however, selecting (306), based on the tracked levels (320) of moisture detected at the zones, between condensation or a leak from within the liquid-carrying pipe as a source of the moisture detected at the zones around the liquid-carrying pipe includes determining (402) whether a moisture level differential (450) between two adjacent zones is greater than a predetermined amount (452). Determining (402) whether a moisture level differential (450) between two adjacent zones is greater than a predetermined amount (452) may be carried out by comparing the moisture level differential (450) to the predetermined amount (452).

If the moisture level differential (450) is greater than the predetermined amount (452), the method of FIG. 4 continues by selecting (404) a leak as the source of the moisture detected at the zones around the liquid-carrying pipe. For example, if adjacent zones have different moisture levels then the moisture may correspond to a leak. Selecting (404) a leak as the source of the moisture detected at the zones around the liquid-carrying pipe may be carried out by storing data within the selection (321) that indicates that the source of the moisture is a leak.

If the moisture level differential (450) is not greater than the predetermined amount (452), the method of FIG. 4 continues by selecting (406) condensation as the source of the moisture detected at the zones around the liquid-carrying pipe. For example, if all of the zones have a gradual and even accumulation of moisture then the detected moisture may correspond to condensation along the liquid-carrying pipe. Selecting (406) condensation as the source of the moisture detected at the zones around the liquid-carrying pipe may be carried out by storing data within the selection (321) that indicates that the source of the moisture is condensation.

Figure 5:
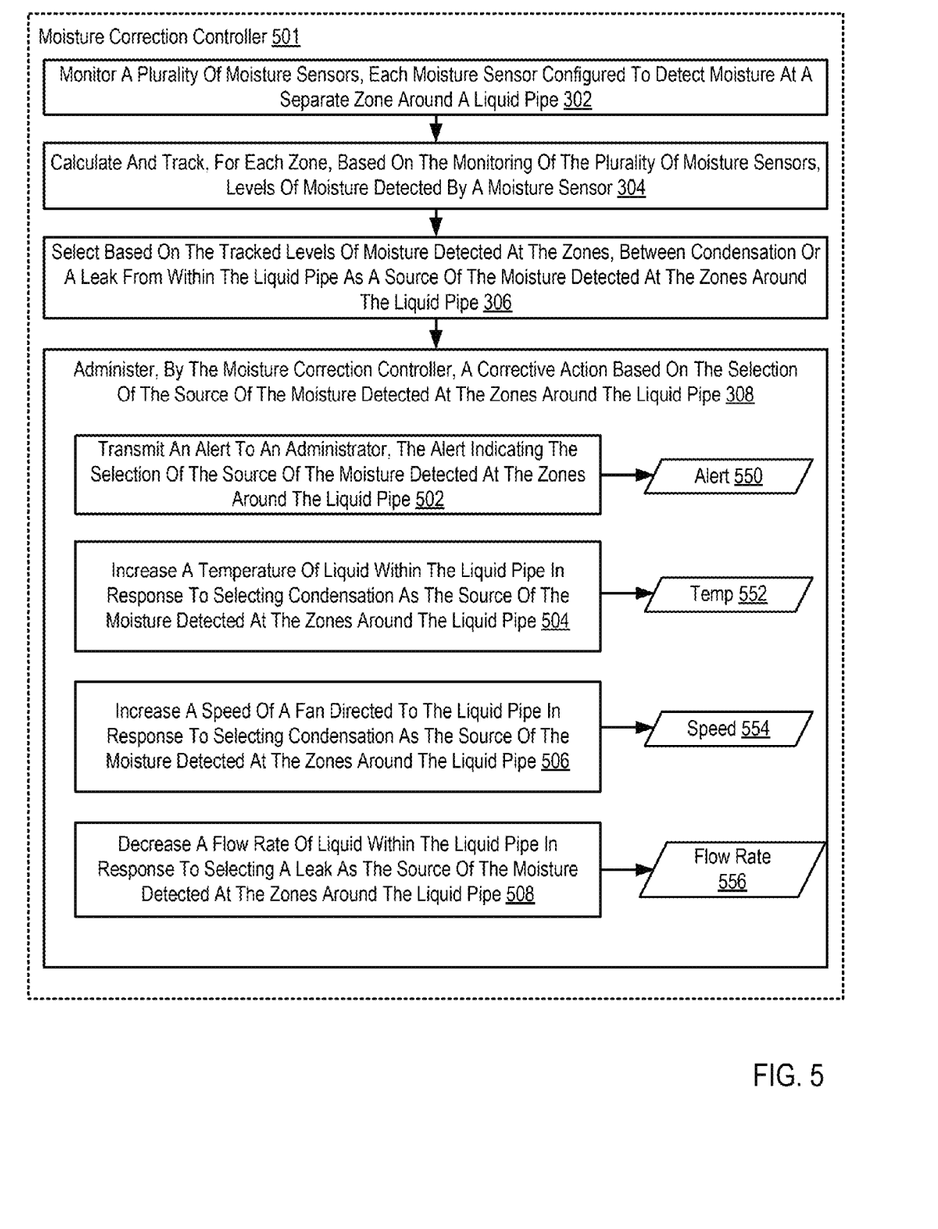
FIG. 5 sets forth a flow chart illustrating a further exemplary method for responding to moisture at one or more zones around an outer surface of a liquid-carrying pipe according to embodiments of the present invention.

For further explanation, FIG. 5 sets forth a flow chart illustrating a further exemplary method for responding to moisture at one or more zones around an outer surface of a liquid-carrying pipe according to embodiments of the present invention. The method of FIG. 5 is similar to the method of FIG. 3 in that the method of FIG. 5 also includes: monitoring (302), by a moisture correction controller (301), a plurality (390) of moisture sensors; based on the monitoring of the plurality (390) of moisture sensors, calculating and tracking (304), for each zone, by the moisture correction controller (301), a level of moisture detected by a moisture sensor; based on the tracked levels (320) of moisture detected at the zones, selecting (306), by the moisture correction controller (301), between condensation or a leak from within the liquid-carrying pipe as a source of the moisture detected at the zones around the liquid-carrying pipe; and administering (308), by the moisture correction controller (301), a corrective action (322) based on the selection (321) of the source of the moisture detected at the zones around the liquid-carrying pipe.

In the method of FIG. 5, however, administering (308) a corrective action (322) based on the selection (321) of the source of the moisture detected at the zones around the liquid-carrying pipe includes transmitting (502) an alert (550) to an administrator (201). In the example of FIG. 5, the alert (550) indicates the selection (320) of the source of the moisture detected at the zones around the liquid-carrying pipe. Transmitting (502) an alert (550) to an administrator (201) may be carried out by sending an email, text message, or other type of message to an administrator.

In the method of FIG. 5, administering (308) a corrective action (322) based on the selection (321) of the source of the moisture detected at the zones around the liquid-carrying pipe includes increasing (504) a temperature (552) of liquid within the liquid-carrying pipe in response to selecting condensation as the source of the moisture detected at the zones around the liquid-carrying pipe. As the difference in temperature between the liquid-carrying pipe and the hot area surrounding the liquid-carrying pipe decreases, the amount of condensation accumulating on the liquid-carrying pipe will decrease. Increasing (504) a temperature (552) of liquid within the liquid-carrying pipe in response to selecting condensation as the source of the moisture detected at the zones around the liquid-carrying pipe may be carried out by instructing a liquid-carrying pipe pump controller to increase the temperature (552).

In the method of FIG. 5, however, administering (308) a corrective action (322) based on the selection (321) of the source of the moisture detected at the zones around the liquid-carrying pipe includes increasing (506) a speed (554) of a fan directed to the liquid-carrying pipe in response to selecting condensation as the source of the moisture detected at the zones around the liquid-carrying pipe. As the fan speed increases, the drying power provided by the air movement along the surface of the liquid-carrying pipe may increase. Increasing (506) a speed (554) of a fan directed to the liquid-carrying pipe in response to selecting condensation as the source of the moisture detected at the zones around the liquid-carrying pipe may be carried out by instructing the fan to increase its speed (554).

In the method of FIG. 5, however, administering (308) a corrective action (322) based on the selection (321) of the source of the moisture detected at the zones around the liquid-carrying pipe includes decreasing (508) a flow rate (556) of liquid within the liquid-carrying pipe in response to selecting a leak as the source of the moisture detected at the zones around the liquid-carrying pipe. Decreasing a flow rate of the liquid may reduce the amount of liquid leaking from the liquid-carrying pipe. Decreasing (508) a flow rate (556) of liquid within the liquid-carrying pipe in response to selecting a leak as the source of the moisture detected at the zones around the liquid-carrying pipe may be carried out by instructing a liquid-carrying pipe pump controller to decrease its flow rate (556). Additional correction actions may be administered in response to determining that the source of the moisture is a leak. For example, the moisture correction controller may include changing power consumption of the system (e.g., shutting down the electrical device cooled by the liquid-carrying pipe). Furthermore, the corrective action that the moisture correction controller may implement in a situation (e.g., leak or condensation) may be user configurable.

Exemplary embodiments of the present invention are described largely in the context of a fully functional computer system for responding to moisture at one or more zones around an outer surface of a liquid-carrying pipe. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method comprising:
by computer program instructions on a computing device,
monitoring a plurality of moisture sensors, each moisture sensor configured to detect moisture at a separate zone around an outer surface of a liquid-carrying pipe;
based on the monitoring of the plurality of moisture sensors, calculating and tracking, for each zone around the outer surface, a level of moisture detected by a moisture sensor;
based on the tracked levels of moisture detected at the zones, selecting between condensation or a leak from within the liquid-carrying pipe as a source of the moisture detected at the zones around the liquid-carrying pipe; and
administering, by the moisture correction controller, a corrective action based on the selection of the source of the moisture detected at the zones around the liquid-carrying pipe, including increasing a temperature of liquid within the liquid-carrying pipe in response to selecting condensation as the source of the moisture detected at the zones around the liquid-carrying pipe.

2. The method of claim 1 wherein selecting between condensation or a leak from within the liquid-carrying pipe as a source of the moisture detected at the zones around the liquid-carrying pipe includes:
determining whether a moisture level differential between two adjacent zones is greater than a predetermined amount;
if the moisture level differential is greater than the predetermined amount, selecting a leak as the source of the moisture detected at the zones around the liquid-carrying pipe; and
if the moisture level differential is not greater than the predetermined amount, selecting condensation as the source of the moisture detected at the zones around the liquid-carrying pipe.

3. The method of claim 1 wherein administering a corrective action based on the selection of the source of the moisture detected at the zones around the liquid-carrying pipe includes:
increasing a speed of a fan directed to the liquid-carrying pipe in response to selecting condensation as the source of the moisture detected at the zones around the liquid-carrying pipe.

4. The method of claim 1 wherein administering a corrective action based on the selection of the source of the moisture detected at the zones around the liquid-carrying pipe includes:
    decreasing a flow rate of liquid within the liquid-carrying pipe in response to selecting a leak as the source of the moisture detected at the zones around the liquid-carrying pipe.

5. The method of claim 1 wherein administering a corrective action based on the selection of the source of the moisture detected at the zones around the liquid-carrying pipe includes:
    transmitting an alert to an administrator, the alert indicating the selection of the source of the moisture detected at the zones around the liquid-carrying pipe.

6. An apparatus comprising a computer processor and a computer memory operatively coupled to the computer processor, the computer memory having disposed within it computer program instructions that, when executed by the computer processor, cause the apparatus to carry out the steps of:
    monitoring a plurality of moisture sensors, each moisture sensor configured to detect moisture at a separate zone around an outer surface of a liquid-carrying pipe;
    based on the monitoring of the plurality of moisture sensors, calculating and tracking, for each zone around the outer surface, a level of moisture detected by a moisture sensor;
    based on the tracked levels of moisture detected at the zones, selecting between condensation or a leak from within the liquid-carrying pipe as a source of the moisture detected at the zones around the liquid-carrying pipe; and
    administering, by the moisture correction controller, a corrective action based on the selection of the source of the moisture detected at the zones around the liquid-carrying pipe, including increasing a temperature of liquid within the liquid-carrying pipe in response to selecting condensation as the source of the moisture detected at the zones around the liquid-carrying pipe.

7. The apparatus of claim 6 wherein selecting between condensation or a leak from within the liquid-carrying pipe as a source of the moisture detected at the zones around the liquid-carrying pipe includes:
    determining whether a moisture level differential between two adjacent zones is greater than a predetermined amount;
    if the moisture level differential is greater than the predetermined amount, selecting a leak as the source of the moisture detected at the zones around the liquid-carrying pipe; and
    if the moisture level differential is not greater than the predetermined amount, selecting condensation as the source of the moisture detected at the zones around the liquid-carrying pipe.

8. The apparatus of claim 6 wherein administering a corrective action based on the selection of the source of the moisture detected at the zones around the liquid-carrying pipe includes:
    increasing a speed of a fan directed to the liquid-carrying pipe in response to selecting condensation as the source of the moisture detected at the zones around the liquid-carrying pipe.

9. The apparatus of claim 6 wherein administering a corrective action based on the selection of the source of the moisture detected at the zones around the liquid-carrying pipe includes:
    decreasing a flow rate of liquid within the liquid-carrying pipe in response to selecting a leak as the source of the moisture detected at the zones around the liquid-carrying pipe.

10. The apparatus of claim 6 wherein administering a corrective action based on the selection of the source of the moisture detected at the zones around the liquid-carrying pipe includes:
    transmitting an alert to an administrator, the alert indicating the selection of the source of the moisture detected at the zones around the liquid-carrying pipe.

11. A computer program product for responding to moisture at one or more zones around an outer surface of a liquid-carrying pipe, the computer program product disposed upon a non-transitory computer readable medium, the computer program product comprising computer program instructions that, when executed, cause a computer to carry out the steps of:
    monitoring a plurality of moisture sensors, each moisture sensor configured to detect moisture at a separate zone around an outer surface of a liquid-carrying pipe;
    based on the monitoring of the plurality of moisture sensors, calculating and tracking, for each zone around the outer surface, a level of moisture detected by a moisture sensor;
    based on the tracked levels of moisture detected at the zones, selecting between condensation or a leak from within the liquid-carrying pipe as a source of the moisture detected at the zones around the liquid-carrying pipe; and
    administering, by the moisture correction controller, a corrective action based on the selection of the source of the moisture detected at the zones around the liquid-carrying pipe, including increasing a temperature of liquid within the liquid-carrying pipe in response to selecting condensation as the source of the moisture detected at the zones around the liquid-carrying pipe.

12. The computer program product of claim 11 wherein selecting between condensation or a leak from within the liquid-carrying pipe as a source of the moisture detected at the zones around the liquid-carrying pipe includes:
    determining whether a moisture level differential between two adjacent zones is greater than a predetermined amount;
    if the moisture level differential is greater than the predetermined amount, selecting a leak as the source of the moisture detected at the zones around the liquid-carrying pipe; and
    if the moisture level differential is not greater than the predetermined amount, selecting condensation as the source of the moisture detected at the zones around the liquid-carrying pipe.

13. The computer program product of claim 11 wherein administering a corrective action based on the selection of the source of the moisture detected at the zones around the liquid-carrying pipe includes:
    increasing a speed of a fan directed to the liquid-carrying pipe in response to selecting condensation as the source of the moisture detected at the zones around the liquid-carrying pipe.

14. The computer program product of claim 11 wherein administering a corrective action based on the selection of the source of the moisture detected at the zones around the liquid-carrying pipe includes:

decreasing a flow rate of liquid within the liquid-carrying pipe in response to selecting a leak as the source of the moisture detected at the zones around the liquid-carrying pipe.

15. The computer program product of claim 11 wherein administering a corrective action based on the selection of the source of the moisture detected at the zones around the liquid-carrying pipe includes:

transmitting an alert to an administrator, the alert indicating the selection of the source of the moisture detected at the zones around the liquid-carrying pipe.

16. The computer program product of claim 11 wherein the computer readable medium comprises a storage medium.

\* \* \* \* \*